US008955003B2

(12) United States Patent  
Litvinov

(10) Patent No.: US 8,955,003 B2  
(45) Date of Patent: Feb. 10, 2015

(54) APPARATUS, SYSTEMS AND METHODS FOR A MEDIA DEVICE PRE-OPERATION

(75) Inventor: Maxim Litvinov, Kharkiv (UA)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/118,431

(22) PCT Filed: May 19, 2011

(86) PCT No.: PCT/UA2011/000038  
§ 371 (c)(1),  
(2), (4) Date: Nov. 18, 2013

(87) PCT Pub. No.: WO2012/158128  
PCT Pub. Date: Nov. 22, 2012

(65) Prior Publication Data  
US 2014/0090006 A1   Mar. 27, 2014

(51) Int. Cl.
| | |
|---|---|
| H04H 60/56 | (2008.01) |
| H04N 21/485 | (2011.01) |
| H04N 5/44 | (2011.01) |
| H04N 21/422 | (2011.01) |
| H04N 21/41 | (2011.01) |
| H04N 21/436 | (2011.01) |
| H04N 21/466 | (2011.01) |

(52) U.S. Cl.  
CPC ........... *H04N 21/485* (2013.01); *H04N 5/4403* (2013.01); *H04N 21/42204* (2013.01); *H04N 21/4113* (2013.01); *H04N 21/4131* (2013.01); *H04N 21/42202* (2013.01); *H04N 21/43615* (2013.01); *H04N 21/4667* (2013.01); *H04N 2005/4428* (2013.01)

USPC ... 725/12; 725/9; 725/10; 725/14; 340/545.1; 340/545.6; 700/19

(58) Field of Classification Search  
USPC ........................................... 725/9, 10, 12, 14  
See application file for complete search history.

(56) References Cited

U.S. PATENT DOCUMENTS

| | | | | |
|---|---|---|---|---|
| 4,954,899 | A * | 9/1990 | Tanabe et al. .................... | 725/14 |
| 5,541,585 | A * | 7/1996 | Duhame et al. ............... | 340/5.62 |
| 6,901,439 | B1* | 5/2005 | Bonasia et al. ............... | 709/220 |
| 2003/0061183 | A1* | 3/2003 | Schaffer et al. .................... | 706/8 |
| 2006/0242665 | A1* | 10/2006 | Knee et al. ....................... | 725/38 |
| 2010/0097225 | A1* | 4/2010 | Petricoin, Jr. .............. | 340/573.1 |
| 2010/0122296 | A1* | 5/2010 | Beyabani et al. ............... | 725/46 |
| 2011/0032423 | A1* | 2/2011 | Jing et al. ...................... | 348/552 |

FOREIGN PATENT DOCUMENTS

| | | |
|---|---|---|
| EP | 0294191 A2 | 12/1988 |
| WO | 03067544 A1 | 8/2003 |

* cited by examiner

*Primary Examiner* — Robert Hance  
(74) *Attorney, Agent, or Firm* — Lowe Graham Jones PLLC

(57) ABSTRACT

Systems and methods are operable to perform pre-operations at a media device in anticipation of an occurrence of a user action. An exemplary embodiment receives an in-use signal from an electronic device that is remotely proximate to the media device, wherein the received in-use signal corresponds to a user interaction with the electronic device; and performs the pre-operation at the media device. The pre-operation is performed prior to receiving an initial user action configured to operate at least one of the media device and a media presentation device coupled to the media device.

18 Claims, 2 Drawing Sheets

APPARATUS, SYSTEMS AND METHODS FOR A MEDIA DEVICE PRE-OPERATION

PRIORITY CLAIM

This application is a §371 National Stage Application of International Application No. PCT/UA2011/000038, filed May 19, 2011, and entitled "APPARATUS, SYSTEMS AND METHODS FOR A MEDIA DEVICE PRE OPERATION." Accordingly, the present application claims priority to and the benefit of the filing date of International Application No. PCT/UA2011/000038, which is incorporated herein by reference in its entirety.

BACKGROUND

Media devices, such as a set top box, are configured to present media content of interest on a media presentation device, such as a television or the like. However, if the media device and/or the media presentation device are not in active use, there may be some discernable delay from the time the user initiates activity on the media device and the time that the media device becomes responsive. Accordingly, there is a need in the arts to provide a quicker responding media device.

SUMMARY

Systems and methods of performing pre-operations at a media device in anticipation of an occurrence of a user action are disclosed. An exemplary embodiment receives an in-use signal from an electronic device that is remotely proximate to the media device, wherein the received in-use signal corresponds to a user interaction with the electronic device; and performs a pre-operation at the media device, wherein the pre-operation is performed prior to receiving an initial user action configured to operate at least one of the media device and a media presentation device coupled to the media device.

BRIEF DESCRIPTION OF THE DRAWINGS

Preferred and alternative embodiments are described in detail below with reference to the following drawings.

DETAILED DESCRIPTION

Figure 1:
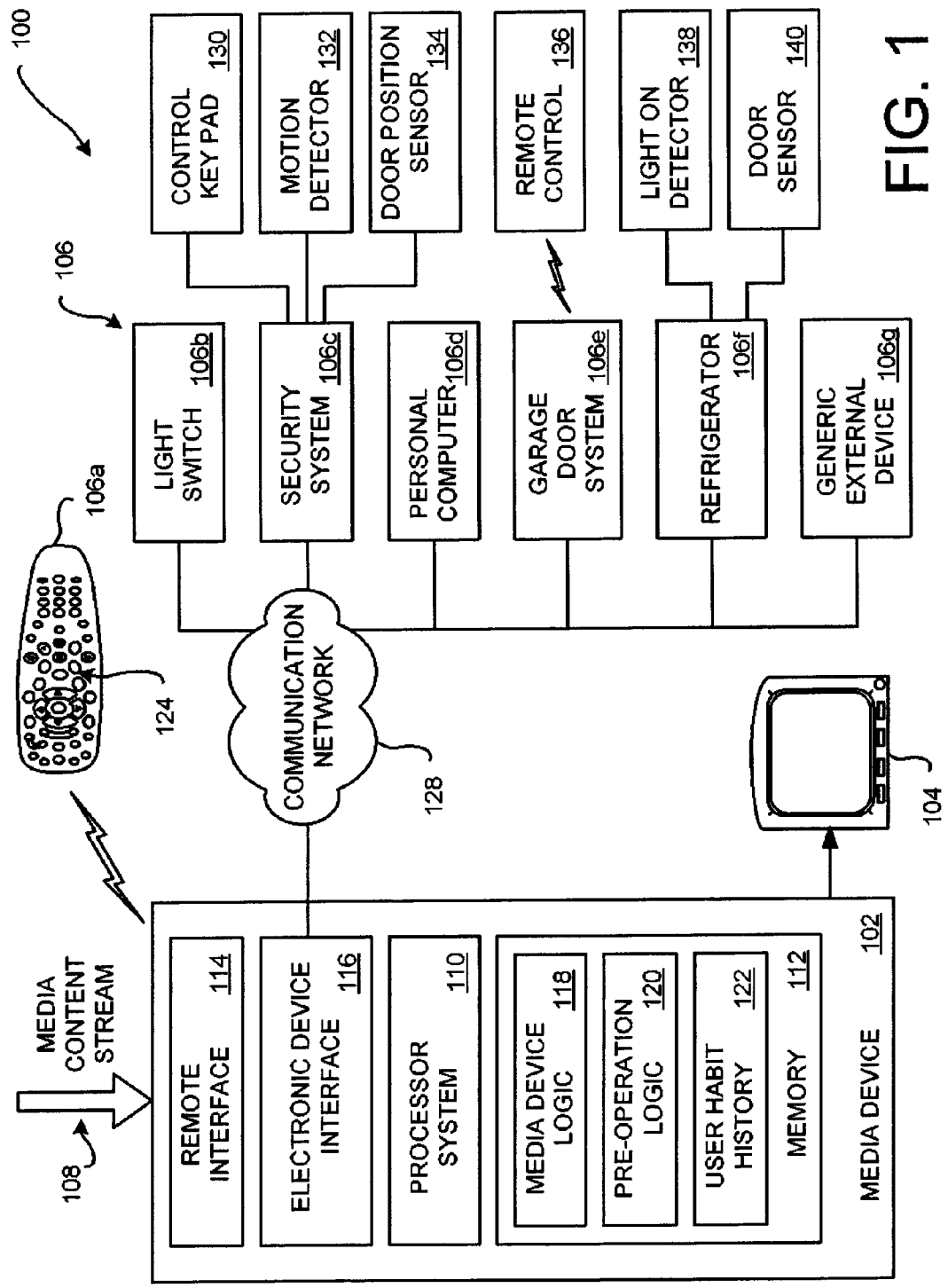
FIG. 1 is a block diagram of an embodiment of a pre-operation system implemented in a media device and a plurality of exemplary electronic devices.

FIG. 1 is a block diagram of an embodiment of a pre-operation system 100 implemented in a media device 102, such as, but not limited to, a set top box (STB). Embodiments of the pre-operation system 100 may be implemented in other media devices, such as, but not limited to, a stereo, a surround-sound receiver, a radio, a television (TV), a digital video disc (DVD) player, a digital video recorder (DVR), a game playing device, or a personal computer (PC) that is configured to receive communications from a remote control 106a. Embodiments of the pre-operation system 100 may be implemented in one or more electronic devices 106.

Embodiments of the pre-operation system 100 are configured to learn and to predict at least one operation that is expected to be preformed by a user based upon a user history of prior operations (e.g., initial user actions) performed by the media device 102 and/or its attendant media presentation device 104. Embodiments of the pre-operation system 100 receive an in-use signal from an electronic device 106 that is in remote proximity to the media device 102. The in-use signal corresponds to an interaction between the electronic device 106 and the user. Based on the received in-use signal, embodiments of the pre-operation system 100 are configured to predict that in the near future the user will be operating the media device 102. Embodiments then cause the media device 102 to perform at least one pre-operation in anticipation that the user will be using the media device 102 in the relatively near future. That is, embodiments are configured to predict that one or more initial user actions will likely occur in the near term based upon receiving the in-use signal from the electronic device 106.

For example, the user may be operating the other electronic device 106 to perform a function related to the electronic device 106. The electronic device 106 communicates the in-use signal to the media device 102. In response to receiving the in-use signal, the media device 102 then performs one or more pre-operations in anticipation of the expected initial user actions. Accordingly, if the initial user action is received within a predefined duration after receiving the in-use signal from the electronic device 106, then the media device 102, and/or a media presentation device 104 controlled by the media device 102, are configured to more quickly respond to the occurrence of the initial user action.

In an exemplary embodiment, the media device 102 and the electronic devices 106 are located at a customer premises, such as a residence, office, or the like. Accordingly, the electronic devices 106 are in remote proximity to the media device 102. Here, remote proximity is some distance between the electronic device 106 and the media device 102. That is, the electronic device 106 is remote from the media device 102, yet is not so far away from the media device 102 that the user will not likely be operating the media device 102 and/or the media presentation device 104 shortly thereafter. That is, when an interaction between the user and the electronic device 106 occurs, within some predefined duration, there is a likelihood that the user will be operating the media device 102 and/or the media presentation device 104.

In an exemplary application, the media device 102 is illustrated as being communicatively coupled to a media presentation device 104, such as a video presentation device, a sound presentation device, or a combination thereof. Non-limiting examples of the media presentation device 104 include televisions, monitors, stereos, surround-sound receivers, or the like that are configured to present media content received in a media content stream 108. In some embodiments, the media device 102 and the media presentation device 104 may be integrated together into a single electronic device.

In an example operating situation, the media device 102 may be in a powered-down mode, a sleep mode, or the like, prior to use by the user. If the user otherwise begins to use the media device 102, a discernable amount of time may be required for the media device 102 and/or its attendant media presentation device 104 to present media content to the user. That is, some amount of time may be required for various components in the media device 102 and/or its attendant media presentation device 104 to become operational. Alternatively, or additionally, some amount of time may be required for the media device 102 to acquire various types of content, such as electronic program guide (EPG) information or content available on a particular channel that the user typically views.

However, embodiments receive the in-use signal from at least one electronic device 106 before the user initially operates the media device 102 and/or its attendant media presentation device 104. Upon receiving the in-use signal from the electronic device 106, embodiments of the pre-operation system 100 cause the controlled media device 102 to perform one or more pre-operations. For example, but not limited to, the media device 102 and/or its attendant media presentation device 104 may power up (e.g., providing power) one or more of its components so that the powered components are operational when the user begins to operate the media device 102 and/or its attendant media presentation device 104. Alternatively, or additionally, the media device 102 may tune itself to a particular channel that the user often views after they begin to operate the media device 102 and/or its attendant media presentation device 104. As another non-limiting example of a pre-operation, the media device 102 may acquire EPG information and/or EPG updates so that when the user begins to operate the media device 102, a current and complete set of EPG information is available. Alternatively, or additionally, the media device 102 may pre-operate itself and/or the media presentation device 104 to change the volume output value (volume level) of the output audio portion of the media content to a learned level.

The non-limiting exemplary media device 102 comprises a processor system 110, a memory 112, an optional remote interface 114, and an optional electronic device interface 116. The memory 112 comprises portions for storing the media device logic 118, the pre-operation logic 120, and the user habit history 122. In some embodiments, the media device logic 118 and the pre-operation logic 120 may be integrated together, and/or may be integrated with other logic. In other embodiments, some or all of these memory and other data manipulation functions may be provided by and using remote server or other electronic devices suitably connected via the Internet or otherwise to a client device. Other media devices 102 may include some, or may omit some, of the above-described media processing components. Further, additional components not described herein may be included in alternative embodiments.

An exemplary media device 102 includes the remote interface 114 that is configured to receive wireless signals from a remote control 106a. The user, by actuating one or more of the controllers 124 on the surface of the remote control 106a, may operate the media device 102 and/or its attendant media presentation device 104 to present media content. Accordingly, a wireless in-use signal communicated from the remote control 106a is generated in response to actuation of one of a plurality of controllers 124 of the remote control 106a. The receipt of, and processing of, the received wireless in-use signal is performed by the processor system 110 under the management of the media device logic 118.

An exemplary embodiment of the pre-operation system 100 may "learn" that when the remote control 106a is picked up by the user, it is very likely that the user will begin operation of the media device 102. Accordingly, upon receiving the in-use signal from the remote control 106a corresponding to an initial movement of the remote control 106a, the media device 102 may perform one or more pre-operations.

For example, but not limited to, the media device 102 may pre-tune itself to a channel frequently watched by the user in response to receiving the in-use signal from the remote control 106a. The media device 102 may then begin to receive and process the media content of the pre-tuned channel. The pre-tuning, and the processing of the media content, is performed by the processor system 110 under the management of the media device logic 118 using instructions determined under the management of the pre-operation logic 120. In the event that the user begins to operate the media device 102 and/or its attendant media presentation device 104 to view media content, and in the further event that the user selects the pre-tuned channel, then the media content of the pre-tuned channel is already being received and processed by the media device 102, and therefore, is more rapidly available for presentation.

Some embodiments of the remote control 106a may contain a device (not shown) that senses motion of the remote control 106a. For example, one or more micro-electro-mechanical (MEM) accelerometers and/or gyroscopes may reside in the remote control 106a to sense movement of the remote control 106a. When the user initially picks up the remote control 106a, the movement is detected and an in-use signal is sent from the remote control 106a to the media device 102. In response to receiving the in-use signal, the media device performs the one or more pre-operations in anticipation of further use of the remote control 106a by the user to operate the media device 102 and/or its attendant media presentation device 104.

Alternatively, or additionally, the user may first actuate one of the controllers 124 of the remote control 106a to generate a first user command that is communicated from the remote control 106a to the media device 102 in a wireless signal. For example, the user may operate the remote control 106a to turn on the media presentation device 104. In response to receiving the first user command from the remote control 106a, and in addition to turning on the media presentation device 104, the media device 102 may also perform one or more pre-operations, such as tuning to a particular channel, setting a volume level, or the like.

In the various embodiments, the processor system 110, under management of the pre-operation logic 120, monitors a plurality of initial operations of the media device 102 and/or its attendant media presentation device 104 when user commands are received from the remote control 106a. After some number of initial operations are performed by the media device 102 and/or its attendant media presentation device 104 in response to commands received from the remote control 106a, the media device 102 may "learn" about one or more particular initial operations that the media device 102 will likely perform when the user begins to use the remote control 106a.

The learning process may be generally summarized as receiving a prior in-use signal from the electronic device 106 that that is sent in response to the user interaction with the electronic device 106. Then, the prior in-use signal is associated with a subsequent initial user action configured to operate the at least one of the media device 102 and/or the media presentation device 104, wherein the subsequent initial user action is received within a predefined learning duration after receiving the in-use signal. After a plurality of associations between the prior in-use signal and the subsequent initial user action have been stored in the user habit history 122, embodiments then learn that receiving a subsequent in-use signal from the electronic device 106 is expected to be followed by the initial user action. The "learning" may occur using any suitable learning process.

In the various embodiments, the subsequent initial user action must occur within the learning duration of receiving the in-use signal. If the subsequent initial user action is received within the learning duration, the association is saved into the user habit history 122. If the subsequent initial user action is not received within the learning duration, the association is not saved into the user habit history 122. For example, if the learning duration is fifteen minutes and the subsequent initial user action is received within ten minutes of receiving the in-use signal, it is likely that in future situations, the user will perform the same subsequent initial user action after generation of the in-use signal. In contrast, if the subsequent initial user action is received two hours after receiving the in-use signal, it is not very likely that in future situations, the user will perform the same subsequent initial user action after generation of the in-use signal. Accordingly, this particular association would not be saved into the user habit history 122. Any suitable learning duration may be used. The learning duration may be predefined, or may be user defined, in the various embodiments.

The processor system 110, under the management of the pre-operation logic 120, tracks initial user operations performed by the media device 102 and/or its attendant media presentation device 104. Information corresponding to the plurality of tracked initial user operations is saved into the user habit history 122. After some amount of time, and/or after some number of initial operations, the user habit history 122 will become populated with sufficient information pertaining to initial user actions so as to enable a prediction algorithm of the pre-operation logic 120 to determine likely initial user operations of the media device 102 and/or its attendant media presentation device 104.

After a sufficient number of received in-use signals and associated initial user actions are acquired to populate the user habit history 122, embodiments may perform various statistical analyses processes to predict user habits that indicate an expected operation of the media device 102 and/or its attendant media presentation device 104. Any suitable statistical analysis or prediction algorithm, methodology, or process may be used by the various embodiments of the pre-operation system 100 to "learn" to predict and/or to anticipate one or more likely initial user operations.

The information corresponding to prior user actions, or habits, may be stored in the user habit history 122 portion of memory 112 using any suitable database system. In an exemplary embodiment, a relational database is developed that relates user actions, operations of the media device 102, time and/or date of the media device operations, and/or the source of the in-use signal (e.g., the particular one of the electronic devices 106 that detects its own user action). In some embodiments, the user habit history 122 may reside in another memory medium. The other memory medium may be a component of the media device 102, or may be an external memory medium.

Further, other factors may also be included in the "learning" process. In an exemplary embodiment, time of day may be considered when learning to anticipate the user's actions. Further, the day and/or the date may be considered. Embodiments may define a time of day window (duration) that is around a defined time of day. In an exemplary embodiment, the time that defines the time of day window corresponds to the time of the user interaction with the electronic device 106. Alternatively, the time that defines the time of day window corresponds to the time of the subsequent initial user action. In an exemplary embodiment, the time is based on an average time of the prior occurrences of the initial user interaction with the electronic device 106. Then, if the in-use signal corresponding to the user interaction with the electronic device 106 is received within the predefined time associated with the time of day window, then the pre-operation is performed by the media device 102. Any suitable duration associated with time of day window may be used, such as several minutes, a portion or an hour, an hour, or the like.

For example, but not limited to, the user may come home on weekday nights (Monday-Friday) at approximately 5:30 p.m., and may then watch the 6:00 p.m. news on a particular news channel. If the time associated with the time of day window is 5:30 p.m, and the time of day duration is a half hour on either side of the time, then the pre-operation at the media device 102 is enabled if the user interaction with the electronic device 106 occurs at any time between 5:00 p.m. and 6:00 p.m. Accordingly, if the in-use signal is received at 5:58 p.m., the media device 102 performs the one or more pre-operations.

As another example, movement of the remote control 106a may correspond to a high likelihood that the user will begin operation of the media device 102 and/or its attendant media presentation device 104 to watch media content. Embodiments then correlate the time of day with the in-use signal from the remote control 106a. Accordingly, the media device 102 may initiate one or more power up operations so that components of the media device 102 and/or its attendant media presentation device 104 become more rapidly operational. The power up operations are performed by the processor system 110 under the management of the media device logic 118, wherein instructions determined under the management of the pre-operation logic 120 initiate the power up process.

Alternatively, or additionally, movement of the remote control 106a may correspond to a high likelihood that the media device 102 and/or its attendant media presentation device 104 will be operated to present media content to watch the 6:00 p.m. news on the particular news channel. The likelihood of a particular initial user action may become even greater based on the current time and the current day that the in-use signal from the remote control 106a is received. For example, if the user picks up the remote control 106a at approximately 5:45 p.m. on Tuesday, the media device 102 may pre-tune itself to the news channel that the user typically views at 6:00 p.m. on weekdays. In contrast, if the user picks up the remote control 106a at approximately 5:45 p.m. on Saturday, the media device 102 will not pre-tune itself to the news channel. The process of pre-tuning to the news channel and processing the news broadcast is performed by the processor system 110 under the management of the media device logic 118, wherein instructions determined under the management of the pre-operation logic 120 define the channel that is to be pre-tuned to.

As yet another example, if the user picks up the remote control 106a late at night, the output volume level of the media device 102 and/or its attendant media presentation device 104 may be set to a relatively low level. In this example, embodiments of the pre-operation system 100 may have learned that media content presented late at night is presented at a relatively lower volume so the other members of the household or neighbors will not be disturbed when the user begins to watch media content. In contrast, if the user picks up the remote control 106a at approximately 5:45 p.m., the media device 102 will not adjust volume to the predefined level, or may adjust volume to a different predefined level. Control of the volume levels are performed by the processor system 110 under the management of the media device logic 118, wherein instructions determined under the management of the pre-operation logic 120 specify the volume level at times when the user initially begins to operate the media device 102 and/or its attendant media presentation device 104 late at night.

Other types of electronic devices 106 may be configured to provide an in-use signal to the media device 102 so that the media device 102 may initiate one or more pre-operations on the media device 102 and/or its attendant media presentation device 104. Such other electronic devices 106 may be communicatively coupled to the media device 102 via a suitable communication network 128. The electronic device interface 116 of the media device 102 is configured to communicatively couple to the various electron devices 102, via the communication network 128.

In some embodiments, the communication network 128 may be a wire-based network between the media device 102 and one or more electronic devices 106. The wire-based communication network 128 may be a dedicated network, or even a single wire connector, that is used exclusively to communicate the in-use signal from the electronic device 106 to the media device 102. Alternatively, or additionally, the wire-based communication network 128 may be a multipurpose wire-based network, such as an Ethernet system, a local area network (LAN), or a power line carrier system.

Alternatively, or additionally, the communication network 128 may employ a wireless medium, such as a radio frequency (RF) medium and/or an infrared (IR) medium. Accordingly, the electronic device interface 116 may comprise a suitable wireless receiver or transceiver configured to receive wireless in-use signals from one or more of the other electronic devices 106.

An example of an electronic device 106 is a light switch 106b. In an exemplary embodiment, one or more light switches 106b may be at locations where the user is entering their residence or a particular room. When the user actuates the light switch 106b to turn on (or turn off) a light, an in-use signal is sent from the light switch 106b to the media device 102 indicating that the controlled light has been turned on or turned off. For example, but not limited to, the user may drive into their garage and turn on a garage light after returning home from work at night. Or, the user may turn off the garage light when exiting the garage. In response to receiving the in-use signal from the light switch 106b, the media device 102 may perform one or more pre-operations. For example, the media device 102 may perform a pre-operation to turn on the media presentation device 104 and/or to pre-tune to the channel that the user typically watches after returning home from work in the evening.

Another non-limiting example of an electronic device 106 is a security system 106c. The security system 106c comprises at least one control key pad 130 and a plurality of sensing devices, such as the exemplary motion detector 132 and/or a door position sensor 134. When the security system 106c detects an occurrence of an event, such as detecting of the presence of the user, an in-use signal is sent from the security system 106c to the media device 102. Accordingly, the media device 102 may perform one or more pre-operations in response to receiving the in-use signal form the security system 106c and/or from the particular sensing device. For example, the control key pad 130 may sense a security input (presumably from the authorized user). Alternatively, or additionally, the motion detector 132 may sense motion (presumably of the user) in a particular room or other location. Alternatively, or additionally, the door sensor may sense the user opening a particular door, such as a door of the media room where the media device 102 is located. In these various situations, an in-use signal is sent to the media device 102 so that the media device 102 may perform one or more pre-operations.

Another example of an electronic device 106 is a personal computer 106d. When the user operates the personal computer 106d, an in-use signal is sent from the personal computer 106d to the media device 102 indicating that the user is using the personal computer 106d. For example, but not limited to, the user may be checking their e-mail after returning home from work. Accordingly, the media device 102 may perform one or more pre-operations. For example, the media device 102 may perform a pre-operation to turn on the media presentation device 104 and/or to pre-tune to the channel that the user typically watches after returning home and checking their e-mail in the evening.

Another example of an electronic device 106 is a garage door system 106e. When the user operates the garage door system 106e, an in-use signal is sent from the garage door system 106e (or the garage door remote control 136) to the media device 102 indicating that the garage has been entered. For example, but not limited to, the user may drive into their garage after returning home from work at night. Accordingly, the media device 102 may perform one or more pre-operations. For example, the media device 102 may perform a pre-operation to turn on the media presentation device 104 and/or to pre-tune to the channel that the user typically watches after returning home from work in the evening.

Another exemplary example of an electronic device 106 is a refrigerator 106f. When the user opens the door of the refrigerator 106f to get a snack or the like, an in-use signal is sent from the refrigerator 106f (or the detector 138 that senses that the internal refrigerator light is on, or the door sensor 140 that senses the door opening) to the media device 102 indicating entry into the refrigerator. Accordingly, the media device 102 may perform one or more pre-operations. For example, the media device 102 may perform a pre-operation to turn on the media presentation device 104 and/or to pre-tune to the channel that the user typically watches after getting a snack and/or beverage from the refrigerator 106f.

One or more other generic electronic devices 106g may be communicatively coupled to the media device 102. These generic electronic devices 106g detect the presence of the user or an action by the user, and then send an in-use signal to the media device 102. Based on one or more learned factors, the media device may then perform one or more pre-operations in anticipation that the user will be operating the media device 102 and/or its attendant media presentation device 104 in the near future.

Figure 2:
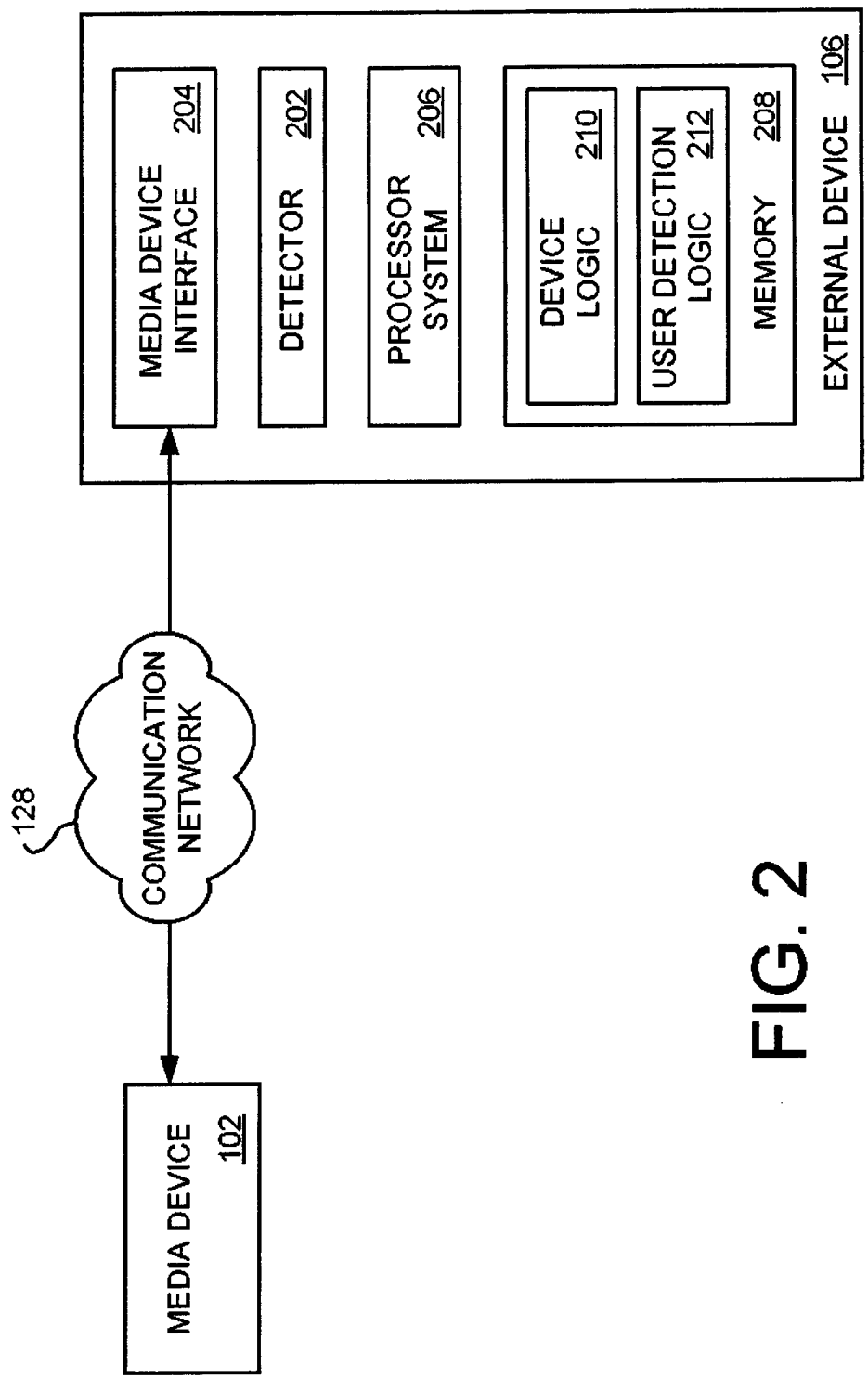
FIG. 2 is a block diagram of an embodiment of an exemplary media device and an exemplary electronic device.

FIG. 2 is a block diagram of an embodiment of an exemplary electronic device 106. The non-limiting exemplary electronic device 106 comprises an optional detector 202 and a media device interface 204. Some embodiments may further comprise a processor system 206 and a memory 208. The memory 208 comprises portions for storing the device logic 210 and the user detection logic 212. In some embodiments, the device logic 210 and the user detection logic 212 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments Some embodiments of the electronic device 106 may be very simple devices and/or may be subcomponents of other systems that perform various functions that are not related to the functionality of the media device 102. For example, the exemplary motion detector 132 (FIG. 1) may be configured to generate an in-use signal that is communicated to the media device 102. The in-use signal may be generated by the detector 202, and may then be communicated to the media device via the media device interface 204. Alternatively, the in-use signal may be communicated to another device, such as the exemplary security system 106c, wherein a corresponding in-use signal is then sent from the other device to the media device 102.

In some situations, an output signal emitted from the electronic device 106 is not related to the function of providing the in-use signal to the media device 102. For example, the output signal emitted from the exemplary motion detector 132 may be intended for the exemplary security system 106c. However, if the output signal from the exemplary motion detector 132 is also communicated to the media device 102 as the in-use signal, then the media device 102 may perform one or more pre-operations in anticipation of the expected initial user actions.

Some electronic devices 106 may be relatively complex electrical devices, and/or may be part of other systems, that perform some function that is not related to the functionality of the media device 102. Such complex system may include their own processor system 206 and memory 208. The processor system 206, under the management of the user detection logic 212, may communicate the in-use signal to the media device 102. Thus, some operations performed by the complex electronic device 106 may be used to generate the in-use signal, while other operations may not be used to generate the in-use signal that is communicated to the media device 102.

For example, the personal computer 106d has its own processor system 206 and memory 208. The processor system 206, under management of the device logic 210, may perform various operations and functions that are not related to the functionality of the media device 102. However, some operations and/or functions may be determined to be of the type for which the in-use signal should be communicated to the media device 102.

As noted above, some electronic devices 106 may not include the detector 202. For example, the personal computer 106d may not include a detector 202. Rather, the user detection logic 212 may be configured to monitor operations of the personal computer 106d, and in response to detecting operation of the personal computer 106d, then communicate the in-use signal to the media device 102 so that the media device 102 may perform one or more pre-operations in anticipation of the expected initial user actions.

Any suitable home appliance may be configured to generate an in-use signal that is communicated to the media device 102. The in-use signal would be generated and communicated in response to the occurrence and/or detection of a user action.

In some embodiments, if the initial user action is not received within the predefined in-use duration after receiving the in-use signal from the electronic device 106, the media device 102 and/or the media presentation device 104 may remain configured in accordance with the pre-operation performed at the media device 102. Alternatively, the media device 102 and/or the media presentation device 104 be reconfigured based on a different set of pre-operations.

It should be emphasized that the above-described embodiments of the pre-operation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method of performing pre-operations at a media device in anticipation of an occurrence of an initial user action to operate the media device that is controllable by a remote control, the method comprising:
   receiving, at the media device, an in-use signal from an electronic device that is remote from the media device, wherein the electronic device is a refrigerator, and wherein the received in-use signal communicated from the refrigerator corresponds to a user opening a door of the refrigerator; and
   performing a pre-operation at the media device in response to receiving the in-use signal from the electronic device, wherein the pre-operation is performed prior to receiving the initial user action configured to operate at least one of the media device and a media presentation device coupled to the media device, and
   wherein the media device becomes operable to respond to the initial user action to operate the media device.

2. The method of claim 1, further comprising: receiving a signal from the remote control, wherein the signal communicated from the remote control is generated in response to the initial user action that is caused by actuation of one of a plurality of controllers of the remote control by the user.

3. The method of claim 1, wherein the electronic device is a first electronic device, and wherein a second electronic device is a security system, and wherein receiving the in-use signal further comprises:
   receiving the in-use signal from the security system, wherein the in-use signal communicated from the security system is generated in response to a detection of a presence of a user; and
   performing the pre-operation at the media device in response to receiving the in-use signal from the security system.

4. The method of claim 1, wherein the electronic device is a first electronic device, and wherein a second electronic device is a garage door system, and wherein receiving the in-use signal further comprises:
   receiving the in-use signal from the garage door system, wherein the in-use signal communicated from the garage door system is generated in response to actuation of the garage door system to open a garage door; and
   performing the pre-operation at the media device in response to receiving the in-use signal from the garage door system.

5. The method of claim 1, wherein the electronic device is a first electronic device, and wherein a second electronic device is a personal computer, and wherein receiving the in-use signal further comprises:
   receiving the in-use signal from the personal computer, wherein the in-use signal communicated from the personal computer is generated in response to a user operating the personal computer; and
   performing the pre-operation at the media device in response to receiving the in-use signal from the personal computer.

6. The method of claim 1, wherein prior to receiving the in-use signal from the electronic device, the method comprising:
   receiving a prior in-use signal from the electronic device corresponding to the user interaction with the electronic device; and
   associating the prior in-use signal with a subsequent initial user action, wherein the subsequent initial user action is the same as the initial user action.

7. The method of claim 6, wherein the receiving and the associating comprises:
   receiving the prior in-use signal and associating the prior in-use signal with the subsequent initial user action a plurality of times;
   storing the plurality of the associations each of the plurality of times; and
learning that receiving the in-use signal from the electronic device is expected to be followed by the initial user action.

8. The method of claim 6, wherein the initial user action is received within a predefined learning duration after receiving the prior in-use signal.

9. The method of claim 1, wherein a time of day is associated with the user interaction with the electronic device, and wherein the pre-operation is performed at the media device in response to the initial user action occurring within a time of day window about the time of day.

10. The method of claim 1, wherein performing the pre-operation at the media device comprises:
providing power to at least one component of the at least one of the media device and the media presentation device, wherein the at least one powered component is operational when the initial user action occurs.

11. The method of claim 1, wherein performing the pre-operation at the media device comprises:
tuning the media device to a channel associated with the initial user action.

12. The method of claim 1, wherein performing the pre-operation at the media device comprises:
changing a volume output value of the at least one of the media device and the media presentation device.

13. A media device configured to communicatively couple to an electronic device, comprising:
an electronic device interface configured to receive an in-use signal from the electronic device that is remote from the media device, wherein the electronic device is a refrigerator, and wherein the received in-use signal corresponds to a user opening a door of the refrigerator;
a remote interface configured to receive wireless signals from a remote control; and
a processor system configured to perform at least one pre-operation of at least one of the media device and a media presentation device coupled to the media device in response to receiving the in-use signal from the electronic device, wherein the at least one pre-operation is performed prior to receiving an initial user action to operate one of the media device and the media presentation device,
wherein the initial user action is received in a wireless signal received from the remote control within a predefined duration after the in-use signal is received from the electronic device.

14. The media device of claim 13, wherein the electronic device interface is configured to communicatively couple the media device to a communication network, and wherein the in-use signal from the electronic device is received via the communication network.

15. A method of performing pre-operations at a media device, wherein the media device is configured to respond to an initial user action to operate the media device that is communicated from a remote control that is operated by a user, and wherein the pre-operations are performed by the media device in anticipation of an occurrence of the initial user action, the method comprising:
receiving over time a plurality of in-use signals from an electronic device, wherein the electronic device is a refrigerator, and wherein the plurality of in-use signals are communicated from the electronic device to the media device in response to a user opening a door of the refrigerator;
receiving for each one of the plurality of in-use signals the initial user action from the remote control;
associating the in-use signal with the initial user action, wherein the initial user action is configured to operate at least one of the media device and a media presentation device coupled to the media device;
storing the plurality of the associations; and
learning that receiving the in-use signal from the electronic device is expected to be followed by the initial user action based on the stored plurality of associations.

16. The method of claim 15, wherein storing the plurality of the associations further comprises:
storing the plurality of the associations only when the initial user action is received within a learning duration.

17. The method of claim 15, wherein after the learning, the method further comprising:
receiving a subsequent in-use signal from the electronic device, wherein the received subsequent in-use signal corresponds to the user interaction with the electronic device; and
performing a pre-operation at the media device, wherein the pre-operation is performed prior to receiving the initial user action from the remote control.

18. The method of claim 1, wherein the electronic device is a security system, and wherein receiving the in-use signal comprises:
receiving the in-use signal from the security system, wherein the in-use signal communicated from the security system is generated in response to an entry of a security input on a control key pad of the security system.

* * * * *